(12) United States Patent
Uher et al.

(10) Patent No.: US 8,848,342 B2
(45) Date of Patent: Sep. 30, 2014

(54) MULTI-LAYERED CONDUCTIVE POLYMER COATINGS FOR USE IN HIGH VOLTAGE SOLID ELECTROLYTIC CAPACITORS

(75) Inventors: Miloslav Uher, Lanskroun (CZ); Jan Petrzilek, Orlici (CZ)

(73) Assignee: AVX Corporation, Fountain Inn, SC (US)

( * ) Notice: Subject to any disclaimer, the term of this patent is extended or adjusted under 35 U.S.C. 154(b) by 377 days.

(21) Appl. No.: 13/220,791

(22) Filed: Aug. 30, 2011

(65) Prior Publication Data

US 2012/0134073 A1 May 31, 2012

Related U.S. Application Data

(60) Provisional application No. 61/417,534, filed on Nov. 29, 2010.

(51) Int. Cl.
| | |
|---|---|
| *H01G 9/02* | (2006.01) |
| *H01G 9/04* | (2006.01) |
| *H01G 9/145* | (2006.01) |
| *H01G 11/56* | (2013.01) |
| *H01G 9/028* | (2006.01) |
| *H01G 11/48* | (2013.01) |
| *H01G 9/15* | (2006.01) |

(52) U.S. Cl.
CPC ............... *H01G 9/028* (2013.01); *H01G 11/56* (2013.01); *Y02E 60/13* (2013.01); *H01G 11/48* (2013.01); *H01G 9/15* (2013.01)
USPC .......................................... 361/525; 361/528

(58) Field of Classification Search
USPC ............................ 361/525, 532, 529, 528, 523
See application file for complete search history.

(56) References Cited

U.S. PATENT DOCUMENTS

| | | | |
|---|---|---|---|
| 4,864,472 A | 9/1989 | Yoshimura et al. |
| 4,910,645 A | 3/1990 | Jonas et al. |
| 4,943,892 A | 7/1990 | Tsuchiya et al. |
| 4,959,430 A | 9/1990 | Jonas et al. |
| 5,019,949 A | 5/1991 | Ikeda et al. |
| 5,071,521 A | 12/1991 | Kojima et al. |
| 5,111,327 A | 5/1992 | Blohm et al. |
| 5,117,332 A | 5/1992 | Kudoh et al. |
| 5,119,274 A | 6/1992 | Kinuta et al. |

(Continued)

FOREIGN PATENT DOCUMENTS

| | | | |
|---|---|---|---|
| JP | 09306788 A | * | 11/1997 |
| WO | WO 2010015468 A1 | | 2/2010 |

(Continued)

*Primary Examiner* — David M Sinclair
(74) *Attorney, Agent, or Firm* — Dority & Manning, P.A.

(57) ABSTRACT

A solid electrolytic capacitor capable of exhibiting stable electrical properties is provided. The capacitor contains an oxidized anode and a conductive polymer coating overlying the anode. The conductive polymer coating contains multiple layers formed from a dispersion of pre-polymerized conductive polymer particles. The present inventors have surprisingly discovered that capacitors formed from such conductive polymer dispersions can operate at high voltages and achieve good electrical performance at relatively high humidity and/or temperature levels and that the problem of layer delamination may be overcome by carefully controlling the conductive polymer coating configuration and the manner in which it is formed. Namely, the coating contains a first layer hat only partially covers the anode so that the gaseous bubbles generated within the first layer can escape via the uncoated portion without tearing away portions of the polymer layer, minimizing formation of surface inhomogeneities that could lead to delamination.

26 Claims, 2 Drawing Sheets

(56) References Cited

U.S. PATENT DOCUMENTS

| | | | |
|---|---|---|---|
| 5,187,649 A | 2/1993 | Kudoh et al. | |
| 5,187,650 A | 2/1993 | Kudoh et al. | |
| 5,300,575 A | 4/1994 | Jonas et al. | |
| 5,424,907 A | 6/1995 | Kojima et al. | |
| 5,457,862 A | 10/1995 | Sakata et al. | |
| 5,473,503 A | 12/1995 | Sakata et al. | |
| 5,729,428 A | 3/1998 | Sakata et al. | |
| 5,812,367 A | 9/1998 | Kudoh et al. | |
| 6,088,218 A | 7/2000 | Hamada et al. | |
| 6,134,099 A | 10/2000 | Igaki et al. | |
| 6,168,639 B1 | 1/2001 | Taketani et al. | |
| 6,215,651 B1* | 4/2001 | Takada et al. | 361/523 |
| 6,224,639 B1 | 5/2001 | Hamada et al. | |
| 6,313,979 B1 | 11/2001 | Taketani et al. | |
| 6,324,050 B1 | 11/2001 | Kobatake et al. | |
| 6,361,572 B1 | 3/2002 | Igaki et al. | |
| 6,369,239 B2 | 4/2002 | Rauchschwalbe et al. | |
| 6,409,777 B2 | 6/2002 | Kobatake et al. | |
| 6,426,866 B2 | 7/2002 | Shoji et al. | |
| 6,462,936 B1 | 10/2002 | Fujimoto et al. | |
| 6,528,662 B2 | 3/2003 | Jonas | |
| 6,614,063 B2 | 9/2003 | Hayashi et al. | |
| 6,635,729 B1 | 10/2003 | Groenendaal et al. | |
| 6,671,168 B2* | 12/2003 | Yoshida et al. | 361/523 |
| 6,674,635 B1 | 1/2004 | Fife et al. | |
| 6,733,545 B2 | 5/2004 | Shoji et al. | |
| 6,756,473 B2 | 6/2004 | Reuter et al. | |
| 6,853,540 B2 | 2/2005 | Kudoh et al. | |
| 6,891,016 B2 | 5/2005 | Reuter et al. | |
| 6,987,663 B2 | 1/2006 | Merker et al. | |
| 7,102,016 B2 | 9/2006 | Reuter | |
| 7,118,690 B2 | 10/2006 | Wessling et al. | |
| 7,125,764 B2 | 10/2006 | Taketani et al. | |
| 7,126,812 B2* | 10/2006 | Hirata et al. | 361/524 |
| 7,154,740 B2 | 12/2006 | Merker et al. | |
| 7,157,326 B2 | 1/2007 | Suda et al. | |
| 7,180,728 B2* | 2/2007 | Kobayashi | 361/524 |
| 7,248,461 B2 | 7/2007 | Takagi et al. | |
| 7,262,954 B1 | 8/2007 | Iida et al. | |
| 7,279,015 B2 | 10/2007 | Merker | |
| 7,341,801 B2 | 3/2008 | Reuter et al. | |
| 7,358,326 B2 | 4/2008 | Heuer et al. | |
| 7,374,585 B2 | 5/2008 | Yoshimitsu et al. | |
| 7,377,947 B2 | 5/2008 | Merker et al. | |
| 7,411,779 B2* | 8/2008 | Merker et al. | 361/523 |
| 7,449,588 B2 | 11/2008 | Jonas et al. | |
| 7,479,166 B2 | 1/2009 | Ito | |
| 7,563,290 B2 | 7/2009 | Qiu et al. | |
| 7,585,983 B2 | 9/2009 | Reuter et al. | |
| 7,729,103 B2 | 6/2010 | Kato et al. | |
| 7,742,281 B2 | 6/2010 | Goto et al. | |
| 7,750,099 B2 | 7/2010 | Chikusa et al. | |
| 7,760,490 B2 | 7/2010 | Takatani et al. | |
| 7,785,493 B2 | 8/2010 | Jonas et al. | |
| 7,800,887 B2 | 9/2010 | Iida et al. | |
| 7,821,772 B2 | 10/2010 | Kobayashi et al. | |
| 7,842,104 B2 | 11/2010 | Yoshimitsu | |
| 7,876,549 B2 | 1/2011 | Umemoto et al. | |
| 7,972,534 B2 | 7/2011 | Merker et al. | |
| 7,973,180 B2 | 7/2011 | Morita et al. | |
| 7,994,345 B2 | 8/2011 | Brassat et al. | |
| 8,027,151 B2 | 9/2011 | Kikuchi et al. | |
| 8,035,953 B2 | 10/2011 | Nemoto et al. | |
| 8,050,014 B2 | 11/2011 | Iwasa et al. | |
| 8,057,553 B2 | 11/2011 | Iwasa et al. | |
| 8,058,135 B2 | 11/2011 | Merker et al. | |
| 8,083,920 B2 | 12/2011 | Yoshimitsu | |
| 8,696,767 B2 | 4/2014 | Shibuya | |
| 2005/0065352 A1 | 3/2005 | Brassat et al. | |
| 2007/0064376 A1 | 3/2007 | Merker et al. | |
| 2008/0005878 A1* | 1/2008 | Merker et al. | 29/25.03 |
| 2008/0247121 A1* | 10/2008 | Qiu et al. | 361/523 |
| 2009/0128997 A1* | 5/2009 | Kikuchi et al. | 361/524 |
| 2009/0310285 A1 | 12/2009 | Reuter et al. | |
| 2010/0079928 A1* | 4/2010 | Harada et al. | 361/523 |
| 2010/0103590 A1* | 4/2010 | Saida et al. | 361/525 |
| 2010/0107386 A1 | 5/2010 | Furukawa et al. | |
| 2010/0110614 A1* | 5/2010 | Umemoto et al. | 361/525 |
| 2010/0136222 A1 | 6/2010 | Furukawa et al. | |
| 2010/0148124 A1 | 6/2010 | Reuter et al. | |
| 2010/0157510 A1 | 6/2010 | Miyachi et al. | |
| 2010/0172068 A1 | 7/2010 | Yoshimitsu | |
| 2010/0182736 A1 | 7/2010 | Miyachi et al. | |
| 2010/0193745 A1 | 8/2010 | Harada et al. | |
| 2010/0232090 A1 | 9/2010 | Harada et al. | |
| 2010/0254071 A1 | 10/2010 | Nishimura | |
| 2010/0271757 A1 | 10/2010 | Ishikawa et al. | |
| 2010/0316862 A1 | 12/2010 | Puppe et al. | |
| 2011/0019339 A1 | 1/2011 | Merker et al. | |
| 2011/0024692 A1 | 2/2011 | Loevenich et al. | |
| 2011/0051319 A1 | 3/2011 | Ishikawa et al. | |
| 2011/0051321 A1 | 3/2011 | Yamaguchi et al. | |
| 2011/0122545 A1 | 5/2011 | Yoshimitsu | |
| 2011/0128675 A1 | 6/2011 | Merker et al. | |
| 2011/0164348 A1 | 7/2011 | Merker et al. | |
| 2011/0168946 A1 | 7/2011 | Loevenich et al. | |
| 2011/0188173 A1 | 8/2011 | Ota et al. | |
| 2011/0205690 A1 | 8/2011 | Komatsu et al. | |
| 2011/0211295 A1 | 9/2011 | Ueda et al. | |
| 2011/0232056 A1 | 9/2011 | Hayashi et al. | |

FOREIGN PATENT DOCUMENTS

| | | |
|---|---|---|
| WO | WO 2010089111 A1 | 8/2010 |
| WO | WO 2010102751 A2 | 9/2010 |
| WO | WO 2010102751 A3 | 9/2010 |

* cited by examiner

MULTI-LAYERED CONDUCTIVE POLYMER COATINGS FOR USE IN HIGH VOLTAGE SOLID ELECTROLYTIC CAPACITORS

CROSS REFERENCE TO RELATED APPLICATIONS

The present application claims benefit of U.S. Provisional Application Ser. No. 61/417,534 having a filing date of Nov. 29, 2010.

BACKGROUND OF THE INVENTION

Electrolytic capacitors (e.g., tantalum capacitors) are increasingly being used in the design of circuits due to their volumetric efficiency, reliability, and process compatibility. For example, one type of capacitor that has been developed is a solid electrolytic capacitor that includes an anode (e.g., tantalum), a dielectric oxide film (e.g., tantalum pentoxide, $Ta_2O_5$) formed on the anode, a solid electrolyte layer, and a cathode. The solid electrolyte layer may be formed from a conductive polymer, such as described in U.S. Pat. No. 5,457,862 to Sakata, et al., U.S. Pat. No. 5,473,503 to Sakata, et al., U.S. Pat. No. 5,729,428 to Sakata, et al., and U.S. Pat. No. 5,812,367 to Kudoh, et al. The major drawback of the existing conductive polymer technology is its limited ability to produce high voltage capacitors, such as those having a rated voltage of more than 25V.

Various attempts have been made to address this problem. For example, U.S. Pat. No. 7,563,290 to Qiu, et al. describes a capacitor that contains a conductive polymer layer formed by dipping an anodized valve metal anode into a slurry of an intrinsically conductive polymer 1 to 15 times for a period of about 0.5 minute to 2 minutes to allow complete slurry coverage of its surface. Unfortunately, however, the present inventors have discovered that capacitors of this nature still tend to exhibit poor leakage current and equivalent series resistance ("ESR") stability in the high humidity and/or high temperature environments associated with many commercial applications. Without intending to be limited by theory, the present inventors believe that when the anode body is fully immersed into a conductive slurry, gaseous bubbles can form in the polymer layer due to the presence of moisture from the slurry. The gaseous bubbles effectively become trapped within the fully applied polymer layer. Therefore, when they are evaporated during drying, they can actually cause portions of the polymer layer to tear away and leave behind inhomogeneities or "blisters" in the surface that reduce the ability of the layer to adhere to the anode body. Upon exposure to high humidity and/or temperature environments, these blisters can cause the layer to delaminate from the anode body, thereby reducing the degree of electrical contact and resulting in increased leakage current and ESR.

As such, a need currently exists for a solid electrolytic capacitor that contains a conductive polymer electrolyte, and which is capable of exhibiting good electrical performance in a wide variety of applications, including high voltage, humidity, and/or temperature environments.

SUMMARY OF THE INVENTION

In accordance with one embodiment of the present invention, a solid electrolytic capacitor is disclosed that comprises an anodically oxidized anode body and a conductive polymer coating overlying the anode body. The conductive polymer coating includes a first layer and a second layer overlying the first layer. The first and second layer are formed from a dispersion of conductive polymer particles. The first layer covers only a portion of a surface of the anode body, and the second layer covers a greater portion of the surface of the anode body than the first layer.

In accordance with another embodiment of the present invention, a method of for forming a conductive polymer coating on an anode body of a capacitor is disclosed. The anode body has a front surface, rear surface, and at least one side surface extending between the front surface and the rear surface. The method comprises dipping an anode body into a dispersion of conductive polymer particles to form a first layer that covers about 80% or less of the side surface and thereafter dipping the anode body into the dispersion to form a second layer that covers a greater portion of the side surface than the first layer.

Other features and aspects of the present invention are set forth in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

Repeat use of references characters in the present specification and drawings is intended to represent same or analogous features or elements of the invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Generally speaking, the present invention is directed to a solid electrolytic capacitor that is capable of exhibiting stable electrical properties (e.g., leakage current and ESR) in a wide variety of operational conditions. The capacitor contains an oxidized anode body and a conductive polymer coating overlying the anode body. The conductive polymer coating contains multiple layers formed from a dispersion of pre-polymerized conductive polymer particles. Unlike conventional attempts, the present inventors have surprisingly discovered that capacitors formed from such conductive polymer dispersions can operate at high voltages, and also achieve good electrical performance at relatively high humidity and/or temperature levels. More particularly, the present inventors have discovered that the problem of layer delamination may be overcome by carefully controlling the configuration of the conductive polymer coating and the manner in which it is formed. Namely, the coating contains a first layer that only partially covers the anode body. Because the anode body is not completely coated, the gaseous bubbles generated within the first layer are able to more easily escape via the uncoated portion without tearing away portions of the polymer layer. This minimizes the subsequent formation of surface inhomogeneities that could otherwise lead to delamination. The coating may likewise contain a second layer that overlies the first layer, and covers substantially the entire surface of the anode body.

Various embodiments of the present invention will now be described in more detail.

A. Anode Body

The anode of the solid electrolytic capacitor may be formed from a valve metal composition having a specific charge broadly ranging from about 5,000 µF*V/g to about 300,000 µF*V/g. As described above, the capacitor of the present invention may be particularly suitable for use in high voltage applications. Such high voltage parts may require the formation of a relatively thick dielectric layer that can grow between the spaces and pores of the anode particles. To optimize the ability to grow the dielectric in this manner, the anode may be formed from a powder having a low specific charge. That is, the powder may have a specific charge of less than about 70,000 microFarads*Volts per gram ("µF*V/g"), in some embodiments about 2,000 µF*V/g to about 65,000 µF*V/g, and in some embodiments, from about 5,000 to about 50,000 µF*V/g.

The valve metal composition contains a valve metal (i.e., metal that is capable of oxidation) or valve metal-based compound, such as tantalum, niobium, aluminum, hafnium, titanium, alloys thereof, oxides thereof, nitrides thereof, and so forth. For example, the valve metal composition may contain an electrically conductive oxide of niobium, such as niobium oxide having an atomic ratio of niobium to oxygen of 1:1.0±1.0, in some embodiments 1:1.0±0.3, in some embodiments 1:1.0±0.1, and in some embodiments, 1:1.0±0.05. For example, the niobium oxide may be $NbO_{0.7}$, $NbO_{1.0}$, $NbO_{1.1}$, and $NbO_2$. In a preferred embodiment, the composition contains $NbO_{1.0}$, which is a conductive niobium oxide that may remain chemically stable even after sintering at high temperatures. Examples of such valve metal oxides are described in U.S. Pat. No. 6,322,912 to Fife; U.S. Pat. No. 6,391,275 to Fife et al.; U.S. Pat. No. 6,416,730 to Fife et al.; U.S. Pat. No. 6,527,937 to Fife; U.S. Pat. No. 6,576,099 to Kimmel, et al.; U.S. Pat. No. 6,592,740 to Fife, et al.; and U.S. Pat. No. 6,639,787 to Kimmel, et al.; and U.S. Pat. No. 7,220,397 to Kimmel, et al., as well as U.S. Patent Application Publication Nos. 2005/0019581 to Schnitter; 2005/0103638 to Schnitter, et al.; 2005/0013765 to Thomas, et al., all of which are incorporated herein in their entirety by reference thereto for all purposes.

Conventional fabricating procedures may generally be utilized to form the anode body. In one embodiment, a tantalum or niobium oxide powder having a certain particle size is first selected. For example, the particles may be flaked, angular, nodular, and mixtures or variations thereof. The particles also typically have a screen size distribution of at least about 60 mesh, in some embodiments from about 60 to about 325 mesh, and in some embodiments, from about 100 to about 200 mesh. Further, the specific surface area is from about 0.1 to about 10.0 $m^2/g$, in some embodiments from about 0.5 to about 5.0 $m^2/g$, and in some embodiments, from about 1.0 to about 2.0 $m^2/g$. The term "specific surface area" refers to the surface area determined by the physical gas adsorption (B.E.T.) method of Bruanauer, Emmet, and Teller, Journal of American Chemical Society, Vol. 60, 1938, p. 309, with nitrogen as the adsorption gas. Likewise, the bulk (or Scott) density is typically from about 0.1 to about 5.0 $g/cm^3$, in some embodiments from about 0.2 to about 4.0 $g/cm^3$, and in some embodiments, from about 0.5 to about 3.0 $g/cm^3$.

To facilitate the construction of the anode body, other components may be added to the electrically conductive particles. For example, the electrically conductive particles may be optionally mixed with a binder and/or lubricant to ensure that the particles adequately adhere to each other when pressed to form the anode body. Suitable binders may include camphor, stearic and other soapy fatty acids, Carbowax (Union Carbide), Glyptal (General Electric), naphthalene, vegetable wax, microwaxes (purified paraffins), polymer binders (e.g., polyvinyl alcohol, poly(ethyl-2-oxazoline), etc), and so forth. The binder may be dissolved and dispersed in a solvent. Exemplary solvents may include water, alcohols, and so forth. When utilized, the percentage of binders and/or lubricants may vary from about 0.1% to about 8% by weight of the total mass. It should be understood, however, that binders and lubricants are not required in the present invention.

The resulting powder may be compacted using any conventional powder press mold. For example, the press mold may be a single station compaction press using a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing. If desired, any binder/lubricant may be removed after compression by heating the pellet under vacuum at a certain temperature (e.g., from about 150° C. to about 500° C.) for several minutes. Alternatively, the binder/lubricant may also be removed by contacting the pellet with an aqueous solution, such as described in U.S. Pat. No. 6,197,252 to Bishop, et al., which is incorporated herein in its entirety by reference thereto for all purposes.

The thickness of the pressed anode body may be relatively thin, such as about 4 millimeters or less, in some embodiments, from about 0.05 to about 2 millimeters, and in some embodiments, from about 0.1 to about 1 millimeter. The shape of the anode body may also be selected to improve the electrical properties of the resulting capacitor. For example, the anode body may have a shape that is curved, sinusoidal, rectangular, U-shaped, V-shaped, etc. The anode body may also have a "fluted" shape in that it contains one or more furrows, grooves, depressions, or indentations to increase the surface to volume ratio to minimize ESR and extend the frequency response of the capacitance. Such "fluted" anodes are described, for instance, in U.S. Pat. No. 6,191,936 to Webber, et al.; U.S. Pat. No. 5,949,639 to Maeda, et al.; and U.S. Pat. No. 3,345,545 to Bourgault et al., as well as U.S. Patent Application Publication No. 2005/0270725 to Hahn, et al., all of which are incorporated herein in their entirety by reference thereto for all purposes.

If desired, an anode lead may also be attached to the anode body. The anode lead may be in the form of a wire, sheet, etc., and may be formed from a valve metal compound, such as tantalum, niobium, niobium oxide, etc. Attachment of the lead may be accomplished using known techniques, such as by welding the lead to the body or embedding it within the anode body during formation.

The anode is also coated with a dielectric. The dielectric may be formed by anodically oxidizing ("anodizing") the sintered anode so that a dielectric layer is formed over and/or within the anode. For example, a tantalum (Ta) anode may be anodized to tantalum pentoxide ($Ta_2O_5$). Typically, anodization is performed by initially applying a solution to the anode, such as by dipping anode into the electrolyte. A solvent is generally employed, such as water (e.g., deionized water). To enhance ionic conductivity, a compound may be employed that is capable of dissociating in the solvent to form ions. Examples of such compounds include, for instance, acids, such as described below with respect to the electrolyte. For example, an acid (e.g., phosphoric acid) may constitute from about 0.01 wt. % to about 5 wt. %, in some embodiments from about 0.05 wt. % to about 0.8 wt. %, and in some embodiments, from about 0.1 wt. % to about 0.5 wt. % of the anodizing solution. If desired, blends of acids may also be employed.

A current is passed through the anodizing solution to form the dielectric layer. The value of the formation voltage manages the thickness of the dielectric layer. For example, the power supply may be initially set up at a galvanostatic mode until the required voltage is reached. Thereafter, the power supply may be switched to a potentiostatic mode to ensure that the desired dielectric thickness is formed over the entire surface of the anode. Of course, other known methods may also be employed, such as pulse or step potentiostatic methods. The voltage at which anodic oxidation occurs typically ranges from about 4 to about 250 V, and in some embodiments, from about 9 to about 200 V, and in some embodiments, from about 20 to about 150 V. During oxidation, the anodizing solution can be kept at an elevated temperature, such as about 30° C. or more, in some embodiments from about 40° C. to about 200° C., and in some embodiments, from about 50° C. to about 100° C. Anodic oxidation can also be done at ambient temperature or lower. The resulting dielectric layer may be formed on a surface of the anode and within its pores.

II. Conductive Polymer Coating

As indicated above, the conductive polymer coating contains multiple layers formed from pre-polymerized conductive polymer particles. The conductive polymer(s) employed in such layers are typically π-conjugated and have electrical conductivity after oxidation or reduction, such as an electrical conductivity of at least about 1 µS cm$^{-1}$ after oxidation. Examples of such π-conjugated conductive polymers include, for instance, polyheterocycles (e.g., polypyrroles, polythiophenes, polyanilines, etc.), polyacetylenes, poly-p-phenylenes, polyphenolates, and so forth. Particularly suitable conductive polymers are substituted polythiophenes having the following general structure:

wherein,

T is O or S;

D is an optionally substituted $C_1$ to $C_5$ alkylene radical (e.g., methylene, ethylene, n-propylene, n-butylene, n-pentylene, etc.);

$R_7$ is a linear or branched, optionally substituted $C_1$ to $C_{18}$ alkyl radical (e.g., methyl, ethyl, n- or iso-propyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl, n-octadecyl, etc.); optionally substituted $C_5$ to $C_{12}$ cycloalkyl radical (e.g., cyclopentyl, cyclohexyl, cycloheptyl, cyclooctyl, cyclononyl cyclodecyl, etc.); optionally substituted $C_6$ to $C_{14}$ aryl radical (e.g., phenyl, naphthyl, etc.); optionally substituted $C_7$ to $C_{18}$ aralkyl radical (e.g., benzyl, o-, m-, p-tolyl, 2,3-, 2,4-, 2,5-, 2-6, 3-4-, 3,5-xylyl, mesityl, etc.); optionally substituted $C_1$ to $C_4$ hydroxyalkyl radical, or hydroxyl radical; and q is an integer from 0 to 8, in some embodiments, from 0 to 2, and in one embodiment, 0; and n is from 2 to 5,000, in some embodiments from 4 to 2,000, and in some embodiments, from 5 to 1,000. Example of substituents for the radicals "D" or "$R_7$" include, for instance, alkyl, cycloalkyl, aryl, aralkyl, alkoxy, halogen, ether, thioether, disulphide, sulfoxide, sulfone, sulfonate, amino, aldehyde, keto, carboxylic acid ester, carboxylic acid, carbonate, carboxylate, cyano, alkylsilane and alkoxysilane groups, carboxylamide groups, and so forth.

Particularly suitable thiophene polymers are those in which "D" is an optionally substituted $C_2$ to $C_3$ alkylene radical. For instance, the polymer may be optionally substituted poly(3,4-ethylenedioxythiophene), which has the following general structure:

Methods for forming conductive polymers, such as described above, are well known in the art. For instance, U.S. Pat. No. 6,987,663 to Merker, et al., which is incorporated herein in its entirety by reference thereto for all purposes, describes various techniques for forming substituted polythiophenes from a monomeric precursor. The monomeric precursor may, for instance, have the following structure:

wherein,

T, D, $R_7$, and q are defined above. Particularly suitable thiophene monomers are those in which "D" is an optionally substituted $C_2$ to $C_3$ alkylene radical. For instance, optionally substituted 3,4-alkylenedioxythiophenes may be employed that have the general structure:

wherein, $R_7$ and q are as defined above. In one particular embodiment, "q" is 0. One commercially suitable example of 3,4-ethylenedioxthiophene is available from H. C. Starck GmbH under the designation Clevios™ M. Other suitable monomers are also described in U.S. Pat. No. 5,111,327 to Blohm, et al. and U.S. Pat. No. 6,635,729 to Groenendaal, et al., which are incorporated herein in their entirety by reference thereto for all purposes. Derivatives of these monomers may also be employed that are, for example, dimers or trimers of the above monomers. Higher molecular derivatives, i.e., tetramers, pentamers, etc. of the monomers are suitable for use in the present invention. The derivatives may be made up of identical or different monomer units and used in pure form and in a mixture with one another and/or with the monomers. Oxidized or reduced forms of these precursors may also be employed.

The thiophene monomers are chemically polymerized in the presence of an oxidative catalyst. The oxidative catalyst may be a transition metal salt, such as a salt of an inorganic or organic acid that contain ammonium, sodium, gold, iron(III), copper(II), chromium(VI), cerium(IV), manganese(IV), manganese(VII), or ruthenium(III) cations. Particularly suitable transition metal salts include halides (e.g., $FeCl_3$ or $HAuCl_4$); salts of other inorganic acids (e.g., $Fe(ClO_4)_3$, $Fe_2(SO_4)_3$, $(NH_4)_2S_2O_8$, or $Na_3Mo_{12}PO_{40}$); and salts of organic acids and inorganic acids comprising organic radicals. Examples of salts of inorganic acids with organic radicals include, for instance, iron(III) salts of sulfuric acid monoesters of $C_1$ to $C_{20}$ alkanols (e.g., iron(III) salt of lauryl sulfate). Likewise, examples of salts of organic acids include, for instance, iron(III) salts of $C_1$ to $C_{20}$ alkane sulfonic acids (e.g., methane, ethane, propane, butane, or dodecane sulfonic acid); iron (III) salts of aliphatic perfluorosulfonic acids (e.g., trifluoromethane sulfonic acid, perfluorobutane sulfonic acid, or perfluorooctane sulfonic acid); iron (III) salts of aliphatic $C_1$ to $C_{20}$ carboxylic acids (e.g., 2-ethylhexylcarboxylic acid); iron (III) salts of aliphatic perfluorocarboxylic acids (e.g., trifluoroacetic acid or perfluorooctane acid); iron (III) salts of aromatic sulfonic acids optionally substituted by $C_1$ to $C_{20}$ alkyl groups (e.g., benzene sulfonic acid, o-toluene sulfonic acid, p-toluene sulfonic acid, or dodecylbenzene sulfonic acid); iron (III) salts of cycloalkane sulfonic acids (e.g., camphor sulfonic acid); and so forth. Mixtures of these above-mentioned salts may also be used.

If desired, polymerization of the monomer may occur in a precursor solution. Solvents (e.g., polar protic or non-polar) may be employed in the solution, such as water, glycols (e.g., ethylene glycol, propylene glycol, butylene glycol, triethylene glycol, hexylene glycol, polyethylene glycols, ethoxydiglycol, dipropyleneglycol, etc.); glycol ethers (e.g., methyl glycol ether, ethyl glycol ether, isopropyl glycol ether, etc.); alcohols (e.g., methanol, ethanol, n-propanol, iso-propanol, and butanol); ketones (e.g., acetone, methyl ethyl ketone, and methyl isobutyl ketone); esters (e.g., ethyl acetate, butyl acetate, diethylene glycol ether acetate, methoxypropyl acetate, ethylene carbonate, propylene carbonate, etc.); amides (e.g., dimethylformamide, dimethylacetamide, dimethylcaprylic/capric fatty acid amide and N-alkylpyrrolidones); sulfoxides or sulfones (e.g., dimethyl sulfoxide (DMSO) and sulfolane); phenolic compounds (e.g., toluene, xylene, etc.), and so forth. Water is a particularly suitable solvent for the reaction. When employed, the total amount of solvents in the precursor solution may be from about 40 wt. % to about 90 wt. %, in some embodiments from about 50 wt. % to about 85 wt. %, and in some embodiments, from about 60 wt. % to about 80 wt. %.

Polymerization of the thiophene monomer generally occurs at a temperature of from about 10° C. to about 100° C., and in some embodiments, from about 15° C. to about 75° C. Upon completion of the reaction, known filtration techniques may be employed to remove any salt impurities. One or more washing steps may also be employed to purify the dispersion.

Upon polymerization, the resulting conductive polymer is generally in the form of particles having a small size, such as an average diameter of from about 1 to about 200 nanometers, in some embodiments from about 2 to about 100 nanometers, and in some embodiments, from about 4 to about 50 nanometers. The diameter of the particles may be determined using known techniques, such as by ultracentrifuge, laser diffraction, etc. The shape of the particles may likewise vary. In one particular embodiment, for instance, the particles are spherical in shape. However, it should be understood that other shapes are also contemplated by the present invention, such as plates, rods, discs, bars, tubes, irregular shapes, etc. The concentration of the particles in the dispersion may vary depending on the desired viscosity of the dispersion and the particular manner in which the dispersion is to be applied to the capacitor. Typically, however, the particles constitute from about 0.1 to about 10 wt. %, in some embodiments from about 0.4 to about 5 wt. %, and in some embodiments, from about 0.5 to about 4 wt. % of the dispersion.

If desired, the formation of the conductive polymer into a particulate form may be enhanced by using a separate counterion to counteract a charged conductive polymer (e.g., polythiophene). That is, the conductive polymer (e.g., polythiophene or derivative thereof) used in the conductive polymer coating typically has a charge on the main polymer chain that is neutral or positive (cationic). Polythiophene derivatives, for instance, typically carry a positive charge in the main polymer chain. In some cases, the polymer may possess positive and negative charges in the structural unit, with the positive charge being located on the main chain and the negative charge optionally on the substituents of the radical "R", such as sulfonate or carboxylate groups. The positive charges of the main chain may be partially or wholly saturated with the optionally present anionic groups on the radicals "R." Viewed overall, the polythiophenes may, in these cases, be cationic, neutral or even anionic. Nevertheless, they are all regarded as cationic polythiophenes as the polythiophene main chain has a positive charge.

The counterion may be a monomeric or polymeric anion. Polymeric anions can, for example, be anions of polymeric carboxylic acids (e.g., polyacrylic acids, polymethacrylic acid, polymaleic acids, etc.); polymeric sulfonic acids (e.g., polystyrene sulfonic acids ("PSS"), polyvinyl sulfonic acids, etc.); and so forth. The acids may also be copolymers, such as copolymers of vinyl carboxylic and vinyl sulfonic acids with other polymerizable monomers, such as acrylic acid esters and styrene. Likewise, suitable monomeric anions include, for example, anions of $C_1$ to $C_{20}$ alkane sulfonic acids (e.g., dodecane sulfonic acid); aliphatic perfluorosulfonic acids (e.g., trifluoromethane sulfonic acid, perfluorobutane sulfonic acid or perfluorooctane sulfonic acid); aliphatic $C_1$ to $C_{20}$ carboxylic acids (e.g., 2-ethyl-hexylcarboxylic acid); aliphatic perfluorocarboxylic acids (e.g., trifluoroacetic acid or perfluorooctanoic acid); aromatic sulfonic acids optionally substituted by $C_1$ to $C_{20}$ alkyl groups (e.g., benzene sulfonic acid, o-toluene sulfonic acid, p-toluene sulfonic acid or dodecylbenzene sulfonic acid); cycloalkane sulfonic acids (e.g., camphor sulfonic acid or tetrafluoroborates, hexafluorophosphates, perchlorates, hexafluoroantimonates, hexafluoroarsenates or hexachloroantimonates); and so forth. Particularly suitable counteranions are polymeric anions, such as a polymeric carboxylic or sulfonic acid (e.g., polystyrene sulfonic acid ("PSS")). The molecular weight of such polymeric anions typically ranges from about 1,000 to about 2,000,000, and in some embodiments, from about 2,000 to about 500,000.

When employed, the weight ratio of such counterions to conductive polymers in a given layer of the conductive polymer coating is typically from about 0.5:1 to about 50:1, in some embodiments from about 1:1 to about 30:1, and in some embodiments, from about 2:1 to about 20:1. The weight of the electrically conductive polymers corresponds referred to the above-referenced weight ratios refers to the weighed-in portion of the monomers used, assuming that a complete conversion occurs during polymerization.

In addition to conductive polymer(s) and optional counterion(s), the dispersion may also contain one or more binders to further enhance the adhesive nature of the polymeric layer and also increase the stability of the particles within the dispersion. The binders may be organic in nature, such as polyvinyl alcohols, polyvinyl pyrrolidones, polyvinyl chlorides, polyvinyl acetates, polyvinyl butyrates, polyacrylic acid esters, polyacrylic acid amides, polymethacrylic acid esters, polymethacrylic acid amides, polyacrylonitriles, styrene/acrylic acid ester, vinyl acetate/acrylic acid ester and ethylene/vinyl acetate copolymers, polybutadienes, polyisoprenes, polystyrenes, polyethers, polyesters, polycarbonates, polyurethanes, polyamides, polyimides, polysulfones, melamine formaldehyde resins, epoxide resins, silicone resins or celluloses. Crosslinking agents may also be employed to enhance the adhesion capacity of the binders. Such crosslinking agents may include, for instance, melamine compounds, masked isocyanates or functional silanes, such as 3-glycidoxypropyltrialkoxysilane, tetraethoxysilane and tetraethoxysilane hydrolysate or crosslinkable polymers, such as polyurethanes, polyacrylates or polyolefins, and subsequent crosslinking.

Dispersion agents may also be employed to facilitate the formation of the conductive polymer coating and the ability to apply it to the anode part. Suitable dispersion agents include solvents, such as aliphatic alcohols (e.g., methanol, ethanol, i-propanol and butanol), aliphatic ketones (e.g., acetone and methyl ethyl ketones), aliphatic carboxylic acid esters (e.g., ethyl acetate and butyl acetate), aromatic hydrocarbons (e.g., toluene and xylene), aliphatic hydrocarbons (e.g., hexane, heptane and cyclohexane), chlorinated hydrocarbons (e.g., dichloromethane and dichloroethane), aliphatic nitriles (e.g., acetonitrile), aliphatic sulfoxides and sulfones (e.g., dimethyl sulfoxide and sulfolane), aliphatic carboxylic acid amides (e.g., methylacetamide, dimethylacetamide and dimethylformamide), aliphatic and araliphatic ethers (e.g., diethylether and anisole), water, and mixtures of any of the foregoing solvents. A particularly suitable dispersion agent is water.

In addition to those mentioned above, still other ingredients may also be used in the dispersion. For example, conventional fillers may be used that have a size of from about 10 nanometers to about 100 micrometers, in some embodiments from about 50 nanometers to about 50 micrometers, and in some embodiments, from about 100 nanometers to about 30 micrometers. Examples of such fillers include calcium carbonate, silicates, silica, calcium or barium sulfate, aluminum hydroxide, glass fibers or bulbs, wood flour, cellulose powder carbon black, electrically conductive polymers, etc. The fillers may be introduced into the dispersion in powder form, but may also be present in another form, such as fibers.

Surface-active substances may also be employed in the dispersion, such as ionic or non-ionic surfactants. Furthermore, adhesives may be employed, such as organofunctional silanes or their hydrolysates, for example 3-glycidoxypropyltrialkoxysilane, 3-aminopropyl-triethoxysilane, 3-mercaptopropyl-trimethoxysilane, 3-metacryloxypropyltrimethoxysilane, vinyltrimethoxysilane or octyltriethoxysilane. The dispersion may also contain additives that increase conductivity, such as ether group-containing compounds (e.g., tetrahydrofuran), lactone group-containing compounds (e.g., γ-butyrolactone or γ-valerolactone), amide or lactam group-containing compounds (e.g., caprolactam, N-methylcaprolactam, N,N-dimethylacetamide, N-methylacetamide, N,N-dimethylformamide (DMF), N-methylformamide, N-methylformanilide, N-methylpyrrolidone (NMP), N-octylpyrrolidone, or pyrrolidone), sulfones and sulfoxides (e.g., sulfolane (tetramethylenesulfone) or dimethylsulfoxide (DMSO)), sugar or sugar derivatives (e.g., saccharose, glucose, fructose, or lactose), sugar alcohols (e.g., sorbitol or mannitol), furan derivatives (e.g., 2-furancarboxylic acid or 3-furancarboxylic acid), an alcohols (e.g., ethylene glycol, glycerol, di- or triethylene glycol).

Regardless of the particular materials employed, the conductive polymer coating of the present invention includes multiple layers formed from a conductive polymer dispersion. A first layer of the coating covers only a portion of the anode body. For example, the first layer typically covers about 80% or less, in some embodiments from about 10% to about 70%, and in some embodiments, from about 20% to about 60% of the surface of the anode body. Because the anode body is only partially coated with the first layer, any generated gaseous bubbles are able to more easily escape via the uncoated portion without tearing away portions of the polymer layer. This minimizes the subsequent formation of surface inhomogeneities that could otherwise lead to delamination. The first layer may have an average thickness of from about 10 nanometers (µm) to about 20 µm, in some embodiments from about 50 nanometers to about 10 µm, and in some embodiments, from about 100 nanometers to about 5 µm.

The coating also contains a second layer that overlies the first layer, and covers a greater portion of the anode body than the first layer. For example, the second layer may cover about 80% or more, in some embodiments from about 80% to 100%, and in some embodiments, from about 90% to 100% of the surface of the anode body. The second layer may have an average thickness of from about 10 nanometers (µm) to about 20 µm, in some embodiments from about 50 nanometers to about 10 µm, and in some embodiments, from about 100 nanometers to about 5 µm. It should of course be understood that the coating may contain multiple other layers in addition to those mentioned above. For example, there may be additional layers that, similar to the first layer, cover only a portion of the anode body. For example, the coating may contain from 1 to 10, and in some embodiments, from 1 to 5 layers that cover only a portion of the anode body. Likewise, there may also be additional layers that, similar to the second layer, cover a substantial portion of the anode body. For example, the coating may contain from 1 to 10, and in some embodiments, from 1 to 5 layers that cover a substantial portion of the anode body. Furthermore, the "first layer" referenced herein need not be the layer located directly adjacent to the anode body. For example, in some embodiments, a layer may be positioned between the "first layer" and the anode body that either partially or substantially covers the surface of the anode body. Regardless, at least one "first layer" will overlie the anode body and at least one "second layer" will overlie the first layer. Typically, the total number of layers in the coating is from 2 to 20, in some embodiments from 2 to 18, and in some embodiments, from 2 to 15. The resulting conductive polymer coating may also have a total a thickness of from about 1 micrometer (μm) to about 200 μm, in some embodiments from about 2 μm to about 50 μm, and in some embodiments, from about 5 μm to about 30 μm.

Figure 4:
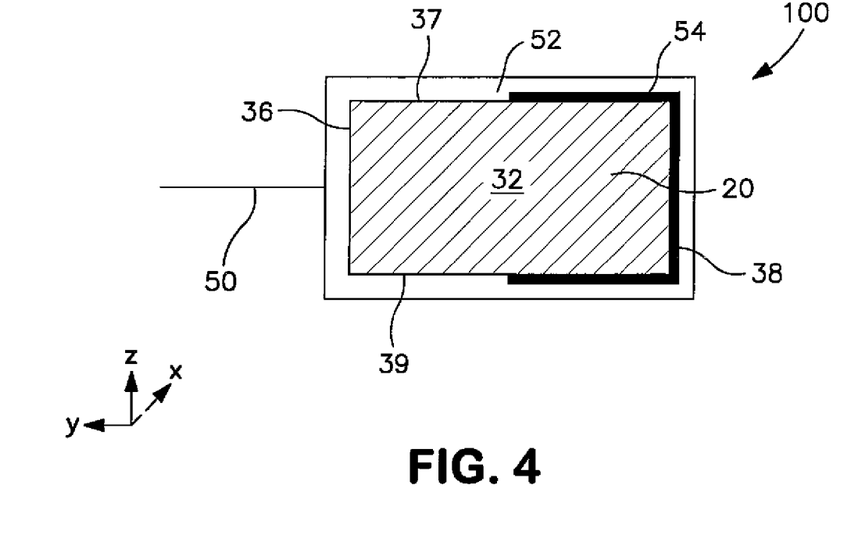
FIG. 4 is a cross-sectional view of one embodiment of the capacitor of the present invention.

The manner in which the layers are disposed on the anode body may vary as desired. Referring to FIG. 4, one particular embodiment of a capacitor 100 is shown that has a generally rectangular shape and contains an anode body 20. The body 20 defines a front surface 36, rear surface 38, top surface 37, bottom surface 39, first side surface 32, and second side surface (not shown). An anode wire 50 extends from the front surface 36 of the capacitor 30 in a longitudinal direction ("y" direction). Although not expressly shown, the anode body 20 is anodically oxidized so that it contains a dielectric layer. In this particular embodiment, the conductive polymer coating contains a first layer 54 overlying the anode body 20 and covering the entire rear surface 38, but only a portion of the top surface 37, bottom surface 39, first side surface 32, and second side surface (not shown). The front surface 36 and the remaining portion of the top and side surfaces remain free of the first layer 54. Of course, it should be understood that the first layer 54 need not be located on such surfaces of the anode body 20. For example, the first layer may only cover the rear surface 38, or it may alternatively be absent from the top surface, bottom surface, and/or the side surfaces. The conductive polymer coating also contains a second layer 52 that overlies the anode body 20 and at least a portion of the first layer 54. Typically, the second layer 52 overlies the anode body at each surface of the capacitor 100, i.e., at the front surface 36, rear surface, 38, top surface 37, bottom surface 39, first side surface 32, and second side surface (not shown). However, this is by no means required. As indicated above, additional layers may optionally be disposed between the first layer 54 and second layer 52, as well as over the second layer 52. Such additional layers may cover any portion of the anode body 20.

The manner in which the layers of the conductive polymer coating are applied to the anode body may vary as desired. For example, the layers may be applied using techniques such as dipping, spin coating, pouring, dropwise application, injection, spraying, doctor blading, brushing, printing (e.g., ink-jet, screen, or pad printing), etc.

Figure 1:
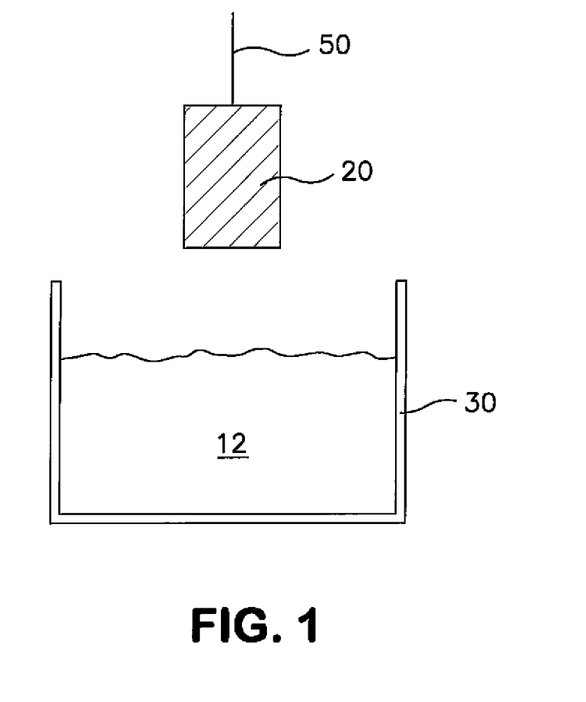
FIG. 1 is a schematic illustration of an anode body before being dipped into a conductive polymer dispersion to form a first layer of the conductive polymer coating.
Figure 2:
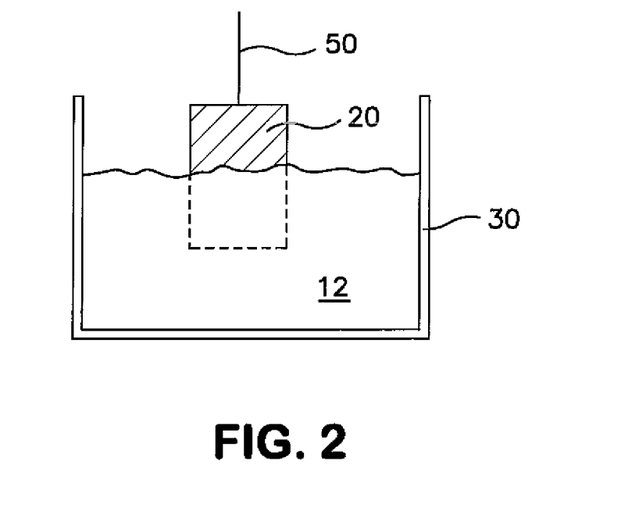
FIG. 2 is a schematic illustration of the anode body of FIG. 1 after being partially dipped into the conductive polymer dispersion.
Figure 3:
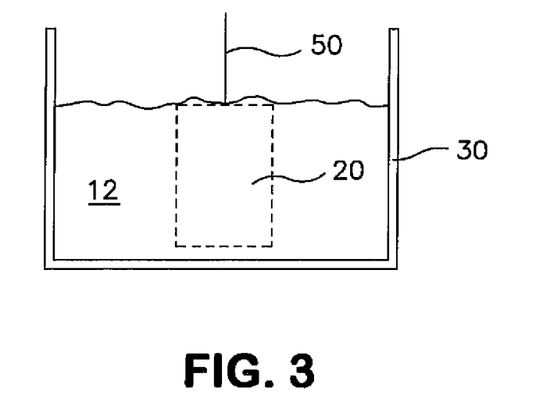
FIG. 3 is a schematic illustration of the anode body of FIG. 1 after being fully dipped into the conductive polymer dispersion to form a second layer of the conductive polymer coating.

Referring to FIGS. 1-3, for example, one technique for forming the first and second layers of the conductive polymer coating is shown in more detail. As shown in FIG. 1, a conductive polymer dispersion 12 is initially provided in a tank 30. To apply the first layer, an anodically oxidized anode body 20 may be dipped into the dispersion 12 so that only a portion of the surface of the anode body is immersed therein (FIG. 2). For example, only about 80% or less, in some embodiments from about 10% to about 70%, and in some embodiments, from about 20% to about 60% of the anode body is typically immersed in the dispersion 12. After being immersed, the anode body 20 may be withdrawn and the dispersion allowed to dry to form the first layer 54 (See FIG. 4). The anode body 20 may then be dipped again into the dispersion 12 so that substantially all of its surface is covered (FIG. 3). For example, about 70% or more, in some embodiments from about 80% to 100%, and in some embodiments, from about 90% to 100% of the anode body 20 is typically immersed in the dispersion 12. The anode body 20 may be withdrawn and the dispersion allowed to dry to form the second layer 52 (See FIG. 4). Additional layers may be formed in a similar manner. During each dipping step, the anode body 20 is generally immersed within the dispersion for a time period ranging from about 0.1 to 10 minutes, in some embodiments from about 0.2 to about 5 minutes, and in some embodiments, from about 0.5 to about 2 minutes. The temperature of the dispersion may range from about 20° C. to about 100° C., but is typically at ambient temperature.

One benefit of employing a conductive polymer coating formed from a dispersion of pre-polymerized particles is that it may minimize the presence of ionic species (e.g., $Fe^{2+}$ or $Fe^{3+}$) produced during in situ polymerization, which can cause dielectric breakdown under high electric field due to ionic migration. Thus, by applying the conductive polymer coating as a dispersion rather through in situ polymerization, the resulting capacitor may exhibit a relatively high "breakdown voltage" (voltage at which the capacitor fails), such as about 60 volts or more, in some embodiments about 80 volts or more, in some embodiments about 100 volts or more, and in some embodiments, from about 120 volts to about 200 volts, as determined by increasing the applied voltage in increments of 3 volts until the leakage current reaches 1 mA. Notwithstanding the above, the capacitor of the present invention may nevertheless employ one or more layers of a conductive polymer formed by in situ polymerization. However, when it is desired to achieve very high breakdown voltages (e.g., from about 120 to 200 volts), the present inventors have discovered that the conductive polymer coating is formed primarily from the polymeric dispersions described above, and that it is generally free of conductive polymers formed via in situ polymerization.

Once formed, the conductive polymer coating may optionally be healed. Healing may be conducted after each application of a layer or may occur after the application of the entire coating. In some embodiments, for example, the conductive polymer coating may be healed by dipping the pellet into an electrolyte solution, such as a solution of acid, and thereafter applying a constant voltage to the solution until the current is reduced to a preselected level. If desired, such healing may be accomplished in multiple steps. After application of some or all of the layers described above, the resulting part may then be washed if desired to remove various byproducts.

The part may optionally be applied with one or more additional layers, such as an external coating that overlies the conductive polymer coating at one or more surfaces of the anode body. The external coating may, for example, contain at least one carbonaceous layer and at least one metal layer that overlies the carbonaceous layer. The metal layer may act as a solderable conductor, contact layer, and/or charge collector for the capacitor, and may be formed from a conductive metal, such as copper, nickel, silver, nickel, zinc, tin, palladium, lead, copper, aluminum, molybdenum, titanium, iron, zirconium, magnesium, and alloys thereof. Silver is a particularly suitable conductive metal for use in the layer. The carbonaceous layer may limit contact between the metal layer and the conductive polymer coating, which would otherwise increase the resistance of the capacitor. The carbonaceous layer may be formed from a variety of known carbonaceous materials, such as graphite, activated carbon, carbon black, etc. The thickness of the carbonaceous layer is typically within the range of from about 1 μm to about 50 μm, in some embodiments from about 2 μm to about 30 μm, and in some embodiments, from about 5 μm to about 10 μm. Likewise, the thickness of the metal layer is typically within the range of from about 1 μm to about 100 μm, in some embodiments from about 5 μm to about 50 μm, and in some embodiments, from about 10 μm to about 25 μm.

Layers may also be employed between the dielectric and the conductive polymer coating. For example, a protective coating may be employed in this manner that includes a relatively insulative resinous material (natural or synthetic). Such materials may have a specific resistivity of greater than about 10 Ω/cm, in some embodiments greater than about 100, in some embodiments greater than about 1,000 Ω/cm, in some embodiments greater than about 1×10$^5$ Ω/cm, and in some embodiments, greater than about 1×10$^{10}$ Ω/cm. Some resinous materials that may be utilized in the present invention include, but are not limited to, polyurethane, polystyrene, esters of unsaturated or saturated fatty acids (e.g., glycerides), and so forth. For instance, suitable esters of fatty acids include, but are not limited to, esters of lauric acid, myristic acid, palmitic acid, stearic acid, eleostearic acid, oleic acid, linoleic acid, linolenic acid, aleuritic acid, shellolic acid, and so forth. These esters of fatty acids have been found particularly useful when used in relatively complex combinations to form a "drying oil", which allows the resulting film to rapidly polymerize into a stable layer. Such drying oils may include mono-, di-, and/or tri-glycerides, which have a glycerol backbone with one, two, and three, respectively, fatty acyl residues that are esterified. For instance, some suitable drying oils that may be used include, but are not limited to, olive oil, linseed oil, castor oil, tung oil, soybean oil, and shellac. These and other protective coating materials are described in more detail U.S. Pat. No. 6,674,635 to Fife, et al., which is incorporated herein in its entirety by reference thereto for all purposes.

The electrolytic capacitor of the present invention may also contain an anode termination to which the anode lead of the capacitor element is electrically connected and a cathode termination to which the cathode of the capacitor element is electrically connected. Any conductive material may be employed to form the terminations, such as a conductive metal (e.g., copper, nickel, silver, nickel, zinc, tin, palladium, lead, copper, aluminum, molybdenum, titanium, iron, zirconium, magnesium, and alloys thereof). Particularly suitable conductive metals include, for instance, copper, copper alloys (e.g., copper-zirconium, copper-magnesium, copper-zinc, or copper-iron), nickel, and nickel alloys (e.g., nickel-iron). The thickness of the terminations is generally selected to minimize the thickness of the capacitor. For instance, the thickness of the terminations may range from about 0.05 to about 1 millimeter, in some embodiments from about 0.05 to about 0.5 millimeters, and from about 0.07 to about 0.2 millimeters. The terminations may be connected using any technique known in the art, such as welding, adhesive bonding, etc. In one embodiment, for example, a conductive adhesive may initially be applied to a surface of the anode and/or cathode terminations. The conductive adhesive may include, for instance, conductive metal particles contained with a resin composition. The metal particles may be silver, copper, gold, platinum, nickel, zinc, bismuth, etc. The resin composition may include a thermoset resin (e.g., epoxy resin), curing agent (e.g., acid anhydride), and coupling agent (e.g., silane coupling agents). Suitable conductive adhesives may be described in U.S. Patent Application Publication No. 2006/0038304 to Osako, et al., which is incorporated herein in its entirety by reference thereto for all purposes.

Once the capacitor is attached, the lead frame may be enclosed within a casing, which may then be filled with silica or any other known encapsulating material. The width and length of the case may vary depending on the intended application. Suitable casings may include, for instance, "A", "B", "F", "G", "H", "J", "K", "L", "M", "N", "P", "R", "S", "T", "W", "Y", or "X" cases (AVX Corporation). Regardless of the case size employed, the capacitor may be encapsulated so that at least a portion of the anode and cathode terminations are exposed. In some cases, the exposed portion of the anode and cathode terminations may be located at the bottom surface of the capacitor in a "facedown" configuration for mounting onto a circuit board. This increases the volumetric efficiency of the capacitor and likewise reduces its footprint on the circuit board. After encapsulation, exposed portions of the anode and cathode terminations may be aged, screened, and trimmed to the desired size.

As a result of the present invention, the capacitor assembly may exhibit excellent electrical properties even when exposed to high humidity and/or temperature environments. For example, the capacitor assembly may have an equivalence series resistance ("ESR") of less than about 200 milliohms, in some embodiments less than about 150 milliohms, in some embodiments from about 0.01 to about 150 milliohms, and in some embodiments, from about 0.05 to about 50 milliohms, measured at an operating frequency of 100 kHz. In addition, the leakage current, which generally refers to the current flowing from one conductor to an adjacent conductor through an insulator, can be maintained at relatively low levels. For example, the numerical value of the normalized leakage current of a capacitor of the present invention is, in some embodiments, less than about 1 µA/µF*V, in some embodiments less than about 0.5 µA/µF*V, and in some embodiments, less than about 0.1 µA/µF*V, where µA is microamps and uF*V is the product of the capacitance and the rated voltage. Such ESR and normalized leakage current values may even be maintained after aging for a substantial amount of time at high humidity and/or high temperatures. For example, the values may be maintained for about 100 hours or more, in some embodiments from about 300 hours to about 3000 hours, and in some embodiments, from about 400 hours to about 2500 hours (e.g., 500 hours, 600 hours, 700 hours, 800 hours, 900 hours, 1000 hours, 1100 hours, 1200 hours, or 2000 hours) at a relative humidity of from about 60% to 95%, and in some embodiments, from about 70% to about 90% (e.g., 85%), and/or at temperatures ranging from about 100° C. to about 250° C., in some embodiments from about 100° C. to about 225° C., and in some embodiments, from about 100° C. to about 225° C. (e.g., 100° C., 125° C., 150° C., 175° C., or 200° C.).

The capacitor may also exhibit a high energy density that enables it suitable for use in high pulse applications. Energy density is generally determined according to the equation $E=\frac{1}{2}*CV^2$, where C is the capacitance in farads (F) and V is the working voltage of capacitor in volts (V). The capacitance may, for instance, be measured at an operating frequency of 120 Hz and a temperature of 23° C. For example, the capacitor may exhibit an energy density of about 2.0 joules per cubic centimeter (J/cm$^3$) or more, in some embodiments about 3.0 J/cm$^3$, in some embodiments from about 4.0 J/cm$^3$ to about 10.0 J/cm$^3$, and in some embodiments, from about 4.5 to about 8.0 J/cm$^3$. The capacitance may likewise be about 1 microFarad per square centimeter ("µF/cm$^2$") or more, in some embodiments about 2 µF/cm$^2$ or more, in some embodiments from about 10 to about 1000 µF/cm$^2$, and in some embodiments, from about 20 to about 60 µF/cm$^2$.

The present invention may be better understood by reference to the following examples.

Test Procedures

Equivalent Series Resistance (ESR)

Equivalence series resistance may be measured using a Keithley 3330 Precision LCZ meter with Kelvin Leads 2.2 volt DC bias and a 0.5 volt peak to peak sinusoidal signal. The operating frequency was 100 kHz and the temperature was 23° C.±2° C.

Capacitance

The capacitance was measured using a Keithley 3330 Precision LCZ meter with Kelvin Leads with 2.2 volt DC bias and a 0.5 volt peak to peak sinusoidal signal. The operating frequency was 120 Hz and the temperature was 23° C.±2° C.

Leakage Current:

Leakage current ("DCL") was measured using a leakage test set that measures leakage current at a temperature of 25° C. and at the rated voltage after a minimum of 60 seconds.

Example 1

A tantalum anode (5.20 mm×3.70 mm×0.85 mm) was anodized at 60V in a liquid electrolyte to 47 μF. A conductive polymer coating was then formed by dipping the entire anode into a poly(3,4-ethylenedioxythiophene) ("PEDT") dispersion (Clevios™ K, solids content of 1.1%). The part was then dried at 125° C. for 20 minutes. This process was repeated 6 times. Thereafter, the part was dipped at a speed of 0.1 mm/s into a PEDT dispersion (solids content of 2.8%) so that the dispersion reached the shoulder of the part as shown in FIG. 3. The part was left in the dispersion for 10 seconds, dried at 125° C. for 30 minutes, and then cooled down to room temperature. This process was repeated 5 times. The part was then coated with graphite and silver, and assembled by gluing the anode into a leadframe pocket, cutting and laser welding the anode wire into the leadframe upstand, and molding the capacitor. The finished part was treated with lead-free reflow. Multiple parts (1,000 pieces) were made in this manner for testing.

Example 2

A tantalum anode (5.20 mm×3.70 mm×0.85 mm) was anodized at 60V in a liquid electrolyte to 47 μF. A conductive polymer coating was then formed by dipping the entire anode into a poly(3,4-ethylenedioxythiophene) ("PEDT") dispersion (Clevios™ K, solids content of 1.1%). The part was then dried at 125° C. for 20 minutes. This process was repeated 6 times. Thereafter, the part was dipped at a speed of 0.1 mm/s into a PEDT dispersion (solids content of 2.0%) so that the dispersion reached only a portion of the part as shown in FIG. 2. The part was left in the dispersion for 10 seconds, dried at 125° C. for 30 minutes, and then cooled down to room temperature. This process was repeated 2 times. Thereafter, the part was dipped at a speed of 0.1 mm/s into the same PEDT dispersion (solids content of 2.0%) so that the dispersion reached the shoulder of the part as shown in FIG. 3. The part was left in the dispersion for 10 seconds, dried at 125° C. for 30 minutes, and then cooled down to room temperature. This process was repeated 8 times. The part was then coated with graphite and silver, and assembled by gluing the anode into a leadframe pocket, cutting and laser welding the anode wire into the leadframe upstand, and molding the capacitor. The finished part was treated with lead-free reflow. Multiple parts (1,000 pieces) were made in this manner for testing. The finished capacitors of Examples 1 and 2 were then tested for electrical performance. The medina results of leakage current, ESR, and capacitance are set forth below in Table 1.

TABLE 1

| Electrical Properties | | | |
| --- | --- | --- | --- |
|  | DCL [μA] | ESR [mOhm] | Cap [μF] |
| Example 1 | 0.12 | 60 | 44.2 |
| Example 2 | 0.10 | 42 | 44.9 |

As indicated, the parts formed from the multi-layered PEDT coating as described herein (Example 2) had a lower leakage current and a significantly lower ESR than the parts of Example 1.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A solid electrolytic capacitor comprising an anodically oxidized anode body, wherein the anode body is formed from a powder having a specific charge of from about 2,000 microFarads*Volts per gram to about 65,000 microFarads*Volts per gram, wherein the anode body is defined by surfaces including a front surface, a rear surface, and at least one side surface extending between the front surface and the rear surface, and a conductive polymer coating overlying the anode body, wherein the conductive polymer coating includes a first layer and a second layer overlying the first layer, wherein the first layer and the second layer are formed from a dispersion of conductive polymer particles, wherein the first layer covers about 80% or less of the side surface of the anode body, wherein the second layer covers a greater portion of the side surface of the anode body than the first layer, wherein the front surface is free of the first layer, and wherein the rear surface is covered by the first layer.

2. The capacitor of claim wherein the conductive polymer particles include a substituted polythiophene having the following general structure:

wherein,

T is O or S;

D is an optionally substituted $C_1$ to $C_5$ alkylene radical;

$R_7$ is a linear or branched, optionally substituted $C_1$ to $C_{18}$ alkyl radical; optionally substituted $C_5$ to $C_{12}$ cycloalkyl radical; optionally substituted $C_6$ to $C_{14}$ aryl radical; optionally substituted $C_7$ to $C_{18}$ aralkyl radical; optionally substituted $C_1$ to $C_4$ hydroxyalkyl radical, or hydroxyl radical; and q is an integer from 0 to 8; and n is from 2 to 5,000.

3. The capacitor of claim 2, wherein the substituted polythiophene has the following general structure:

4. The capacitor of claim 1, wherein the conductive polymer particles include poly(3,4-ethylenedioxythiophene).

5. The capacitor of claim 1, wherein the conductive polymer particles have an average diameter of from about 1 to about 200 nanometers.

6. The capacitor of claim 1, wherein the dispersion further comprises a counterion.

7. The capacitor of claim 6, wherein the counterion includes a polystyrene sulfonic acid.

8. The capacitor of claim 1, wherein the dispersion further comprises a binder.

9. The capacitor of claim 1, wherein the anode body includes a sintered porous pellet formed from tantalum or niobium oxide.

10. The capacitor of claim 1, wherein the first layer covers from about 10% to about 70% of the surfaces of the anode body and the second layer covers from about 80% to 100% of the surfaces of the anode body.

11. The capacitor of claim 1, wherein the first layer covers from about 20% to about 60% of the surfaces of the anode body and the second layer covers from about 90% to 100% of the surfaces of the anode body.

12. The capacitor of claim 1, wherein the second layer covers substantially the entire side surface of the anode body.

13. The capacitor of claim 1, wherein an anode lead extends from the front surface of the anode body.

14. The capacitor of claim 1, wherein the capacitor exhibits a breakdown voltage of about 60 volts or more.

15. A method of for forming a conductive polymer coating on an anode body having a front surface, a rear surface, and at least one side surface extending between the front surface and the rear surface, wherein the anode body is formed from a powder having a specific charge of from about 2,000 microFarads*Volts per gram to about 65,000 microFarads*Volts per pram, the method comprising dipping the anode body into a dispersion of conductive polymer particles to form a first layer that covers about 80% or less of the side surface, wherein the front surface is free of the first layer, and wherein the rear surface is covered by the first layer, and thereafter, dipping the anode body into the dispersion to form a second layer that covers a greater portion of the side surface than the first layer.

16. The method of claim 15, wherein the anode body contains an anodically oxidized, sintered porous pellet formed from tantalum or niobium oxide.

17. The method of claim 15, wherein the substituted polythiophene has the following general structure:

wherein,
$R_7$ is a linear or branched, optionally substituted $C_1$ to $C_{18}$ alkyl radical; optionally substituted $C_6$ to $C_{12}$ cycloalkyl radical; optionally substituted $C_6$ to $C_{14}$ aryl radical; optionally substituted $C_7$ to $C_{18}$ aralkyl radical; optionally substituted $C_1$ to $C_4$ hydroxyalkyl radical, or hydroxyl radical; and
q is an integer from 0 to 8; and
n is from 2 to 5,000.

18. The method of claim 15, wherein the conductive polymer particles include poly(3,4-ethylenedioxythiophene).

19. The method of claim 15, wherein the conductive polymer particles have an average diameter of from about 1 to about 200 nanometers.

20. The method of claim 15, wherein the conductive polymer particles constitute from about 0.1 to about 10 wt. % of the dispersion.

21. The method of claim 15, wherein the anode body is positioned so that the rear surface faces the dispersion before being dipped therein to form the first layer and the second layer.

22. The method of claim 21, wherein the first layer covers the rear surface and from about 10% to about 70% of the side surface, and wherein the second layer covers the rear surface and from about 80% to 100% of the surface.

23. The method of claim 21, wherein the first layer covers the rear surface and from about 20% to about 60% of the side surface, and wherein the second layer covers the rear surface and from about 90% to 100% of the side surface.

24. The method of claim 21, wherein the second layer covers substantially the entire side surface.

25. The method of claim 15, wherein the anode body is withdrawn from the dispersion and dried after application of the first layer and the second layer.

26. A solid electrolytic capacitor formed by the method of claim 15.

* * * * *

UNITED STATES PATENT AND TRADEMARK OFFICE
CERTIFICATE OF CORRECTION

| | | |
|---|---|---|
| PATENT NO. | : 8,848,342 B2 | Page 1 of 1 |
| APPLICATION NO. | : 13/220791 | |
| DATED | : September 30, 2014 | |
| INVENTOR(S) | : Miloslav Uher et al. | |

It is certified that error appears in the above-identified patent and that said Letters Patent is hereby corrected as shown below:

On The Title Page
In the Abstract (line 13)

"...is formed. Namley, the coating contains a first layer hat only..." should read --...is formed. Namely, the coating contains a first layer that only...--

In The Claims
Claim 15 (column 17, line 32)

"A method of for forming a conductive polymer coating..." should read --A method of forming a conductive polymer coating...--

Signed and Sealed this
Twentieth Day of January, 2015

Michelle K. Lee
*Deputy Director of the United States Patent and Trademark Office*